United States Patent
Neple et al.

(10) Patent No.: US 8,474,198 B2
(45) Date of Patent: Jul. 2, 2013

(54) SOUND INSULATING GLAZING DEVICE, IN PARTICULAR FOR AIRCRAFT AND SOUNDPROOFING METHOD FOR GLAZING

(75) Inventors: Pascale Neple, Leguevin (FR); Nathalie Pellegrin, Toulouse (FR); Olivier Collery, Toulouse (FR); Jean Louis Guyader, Charnoz sur Ain (FR)

(73) Assignee: Airbus Operations S.A.S., Toulouse (FR)

( * ) Notice: Subject to any disclaimer, the term of this patent is extended or adjusted under 35 U.S.C. 154(b) by 385 days.

(21) Appl. No.: 12/619,213

(22) Filed: Nov. 16, 2009

(65) Prior Publication Data

US 2010/0123043 A1 May 20, 2010

(30) Foreign Application Priority Data

Nov. 17, 2008 (FR) ...................... 08 57774

(51) Int. Cl.
*E04B 1/84* (2006.01)
*E06B 1/32* (2006.01)

(52) U.S. Cl.
USPC ............. 52/211; 52/212; 52/213; 52/204.54; 52/204.69; 52/308; 181/286

(58) Field of Classification Search
USPC ............. 52/204.5–204.59, 204.591–204.599, 52/210–213, 204.6–204.69, 204.71, 204.1, 52/204.7; 428/34, 122; 181/207–208, 284, 181/286
See application file for complete search history.

(56) References Cited

U.S. PATENT DOCUMENTS

| | | | | |
|---|---|---|---|---|
| 3,837,129 A | * | 9/1974 | Losell | 52/309.14 |
| 4,011,356 A | * | 3/1977 | Lambert et al. | 428/34 |
| 4,068,431 A | * | 1/1978 | Pitt | 52/455 |
| 4,149,348 A | * | 4/1979 | Pyzewski | 52/172 |
| 4,243,719 A | * | 1/1981 | Holmes | 340/550 |
| 4,368,226 A | * | 1/1983 | Mucaria | 428/34 |
| 4,374,693 A | * | 2/1983 | Pitt | 156/267 |
| 4,536,424 A | * | 8/1985 | Laurent | 428/34 |
| 4,791,011 A | * | 12/1988 | Mecca | 428/34 |
| 5,131,194 A | | 7/1992 | Anderson | |

(Continued)

FOREIGN PATENT DOCUMENTS

| | | |
|---|---|---|
| EP | 1300333 A1 | 4/2003 |
| JP | 11229722 A * | 8/1999 |
| WO | 2006054020 A1 | 5/2006 |
| WO | 2008139082 A2 | 11/2008 |

OTHER PUBLICATIONS

Preliminary Search Report from FR 0857774 dated Jun. 29, 2009; Jülich Saskia.
English abstract of EP1300333.

*Primary Examiner* — Jeanette E. Chapman
(74) *Attorney, Agent, or Firm* — Ingrassia Fisher & Lorenz P.C.

(57) ABSTRACT

Sound insulating glazing device for aircrafts, ground or maritime transportation vehicles, buildings, or others, including glazing, a sealing joint in a shape and size corresponding to the edge of the glazing and designed for assembly on said edge, sound insulation, made of at least two materials, a first resilient material and a second material with less resilience than the first, the sound insulation being used against the field of said glazing, between the glazing and the sealing joint. The invention is also for aircrafts that are equipped with at least a glazing device and a soundproofing method for glazing.

11 Claims, 3 Drawing Sheets

U.S. PATENT DOCUMENTS

| | | | |
|---|---|---|---|
| 5,636,484 A * | 6/1997 | DeBlock | 52/204.5 |
| 5,644,894 A * | 7/1997 | Hudson | 52/786.13 |
| 6,119,807 A * | 9/2000 | Benson et al. | 181/208 |
| 6,730,378 B2 * | 5/2004 | Matsuoka et al. | 428/35.7 |
| 7,914,882 B2 * | 3/2011 | Erb et al. | 428/219 |
| 8,053,079 B2 * | 11/2011 | Aoki | 428/426 |

\* cited by examiner

SOUND INSULATING GLAZING DEVICE, IN PARTICULAR FOR AIRCRAFT AND SOUNDPROOFING METHOD FOR GLAZING

CROSS REFERENCE

The present application claims priority to French Patent Application No. 08 57774, filed Nov. 17, 2008, the entirety of which is incorporated herein by reference.

TECHNICAL DOMAIN OF THE INVENTION

The invention is related to a sound insulating glazing device and a sound insulating process for glazing. The device and the process may be used in various domains such as glazing for aircrafts, ground transportation vehicles (cars, buses or trucks, freight cars or cars for trains, tramways or metros, etc.), maritime vehicles, buildings, or other applications. With aircrafts, the process and the device are more particularly adapted for the glazing of the cockpit of a plane. The invention is also relates to an aircraft with such a device.

BACKGROUND OF THE INVENTION

There are two known strategies to diminish the noise transmitted through a glazing. First, an adequate dimensioning of the glass structure itself, which may be comprised of several layers, to which a noise and vibration absorbing material is integrated. A configuration adapted to the outlying joint assures the sealing between the glass and the rest of the structure.

The second approach consists of optimizing the joint's mechanical properties, for example its rigidity and/or its loss factor through absorption and its geometry.

All of these solutions quickly encounter physical limits and no longer satisfy current needs, particularly in the aviation sector. In addition, the dimensioning of a multi-layered glazing to include acoustic criteria proves to be particularly sensitive in the case of complex, thick and initially multi-layered windows like those in the cockpit of a plane. These windows must satisfy multidisciplinary constraints: resistance to bird impact, resistance to lightning, good optical transparency, reduced mass, etc. They are also subjected to a particularly high temperature gradient (−40° C. on the exterior of the plane, +20° C. on the interior).

Regarding the specific dimensioning of the joint for acoustic criteria, the applications affect thin windows, essentially for automobiles. A condition necessary for the acoustic efficiency of this device is that the assembly of the glass/joint duo to the rest of the structure allows the joint to work and dispel energy according to the mode of operation for which it was designed. Its rigidity and loss factor through absorption must be barely modified by the rest of the structure. And yet, the current assembly of cockpit windows does not satisfy this condition: they are inserted in the frame, they burn under the effect of pressurization in flight, the conditions to the limits are thus modified at the periphery. In addition, in the case of the cockpit, the temperature gradient (−40° C. on the exterior of the plane, +20° C. on the interior) imposes a choice of materials made up of the neutral joint in relation to the temperature, which strongly limits the usable materials.

SUMMARY OF THE INVENTION

To avoid these different inconveniences, the invention envisions a sound insulating glazing device, particularly for an aircraft, consisting of a glazing and a sealing joint that corresponds in size and shape to the perimeter of the glazing and is designed for assembly on said perimeter.

According to the invention, said glazing device also includes sound insulation, made of at least two materials; a first material is resilient and a second material has a resilience that is weaker than the first. The sound insulator is disposed against the edge of said glazing, between the glazing and the sealing joint.

According to the various advantageous embodiments, the first material is at least 30% more resilient than the second, and preferably at least 50% more resilient, and even more preferably at least 100% more resilient.

Said glazing may be in one layer or multi-layered depending on the application type concerned.

The device and the process according to the invention allow to significantly improve sound insulation for glazing. The two-material ensemble is inserted at the periphery of the glass, between the glazing and the joint, assuring the sealing of the glass assembly to the rest of the structure. This device is particularly advantageous for cockpit windows on a plane, but the device could also be adapted to other windows for plane cabins, automobiles, trains, boats or building windows.

The invention allows on the one hand to liberate the difficulty of configuring a multi-layered glazing to satisfy non-acoustic criteria, and on the other hand the constraint of a glass/structure assembly that does not modify the dynamic behavior of the joint.

According to a first embodiment, the first and second materials are organized by layers disposed side by side, the first material being disposed against the edge of the glazing, and the second material being disposed on an outer side of the glazing, against the sealing joint.

In an example embodiment, the second material is metallic. For example, it could be an alloy of aluminum, of titanium, of steel, or other.

According to an application example of the first embodiment, said glazing is a multi-layered glazing with an external layer, designed for positioning on the exterior side of the aircraft, and an internal layer, each layer being surmounted by its own sound insulation and of which the mechanical operation characteristics depending on temperature are distinct, the insulation of the exterior layer has mechanical properties that are adapted to lower temperatures than the internal insulation.

According to a variant of an embodiment, the first material differs depending on the glazing zone.

In a second embodiment, the first material forms a matrix housing multiple inclusions of the second material, said matrix being housed in a closed envelope. The first material is advantageously selected from a list including gels, polymers, and rubber blends.

According to a variant of an embodiment, the first material is granular. The first material is therefore advantageously selected from a list including silicate gels and polystyrene.

In another variant, the sound insulator is arranged discontinuously along the edge of the glazing.

The invention also provides for a sound insulating process for glazing, particularly for an aircraft, surmounted by a sealing joint, including stages consisting in:
  providing a first material, resilient type;
  providing a second material, with less resilience than the first material;
  creating with the first and secondary materials a sound insulator band;
  using said band between the edge of the glazing and the sealing joint.

According to various advantageous embodiments, the first material is at least 30% more resilient than the second, and preferably at least 50% more resilient, and even more preferably at least 100% more resilient.

A first embodiment of the process provides that the insulating band has two distinct layers made up of the first and second materials disposed side by side.

A second embodiment of the process provides that the insulating band has one layer, made up of a matrix of the first material in which inclusions of the second material are organized.

The invention allows for an aircraft that has a glazing device such as previously described. The device is therefore preferably used for a cockpit window.

DESCRIPTION OF FIGURES

The invention will be better understood in reading the description that follows and reviewing the attached figures, presented in a non-restrictive way, in which.

DETAILED DESCRIPTION OF THE INVENTION

Figure 1:
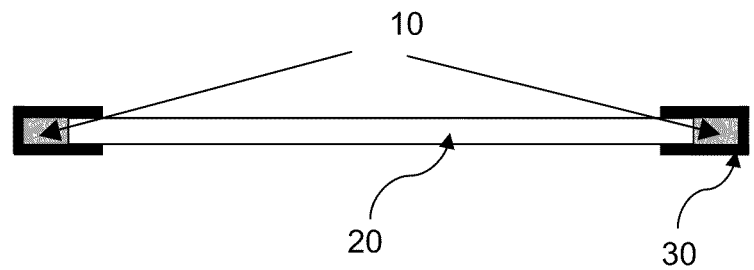
FIG. 1 is a schematic representation of a sound insulating glazing device in accordance with the invention.

The general concept of the glazing device proposed is illustrated in FIG. 1, and consists in including a two-material ensemble 10 at the periphery of the glazing 20. This ensemble is made of a resilient material 11, that is supple and absorbing, combined with a less resilient material 12, or a dense material, such as is presented in FIG. 2. This two-material ensemble 10 functions in a dynamic suppression of vibrations. It is inserted between the sealing joint 30 and the glass 20, on the edge of the glass. In order to maximize efficiency, the glazing device is made up of an ensemble of material elements in sizes and/or masses adapted in function of applications and constraints.

Figure 2:
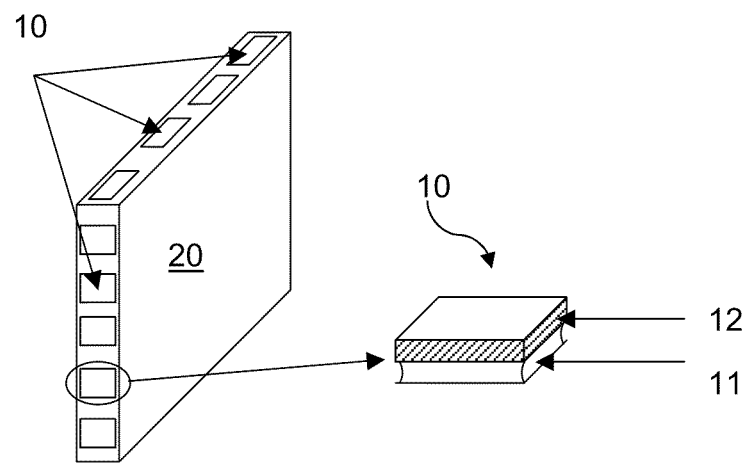
FIG. 2 is a schematic representation of a first embodiment of a sound insulating glazing device in accordance with the invention.

In the first mode of execution, presented in FIG. 2, the device consists in gluing bands of layers of dense material 12 combined with a resilient material 11 that is supple and absorbing, such as is presented in the figure, at the periphery on the edge of the glazing 20. The layers of dense material 12 and resilient material 11 form discrete units that are spaced apart along the periphery on the edge of the glazing. These bands are made up of different materials and weights to maximize acoustic efficiency. They can also have varying geometric shapes, fully or not fully covering the edge of the glass. The precise configuration of these bands depends on the glazing from an acoustic point of view and the range of frequencies where noise diminishing is desired.

Figure 3:
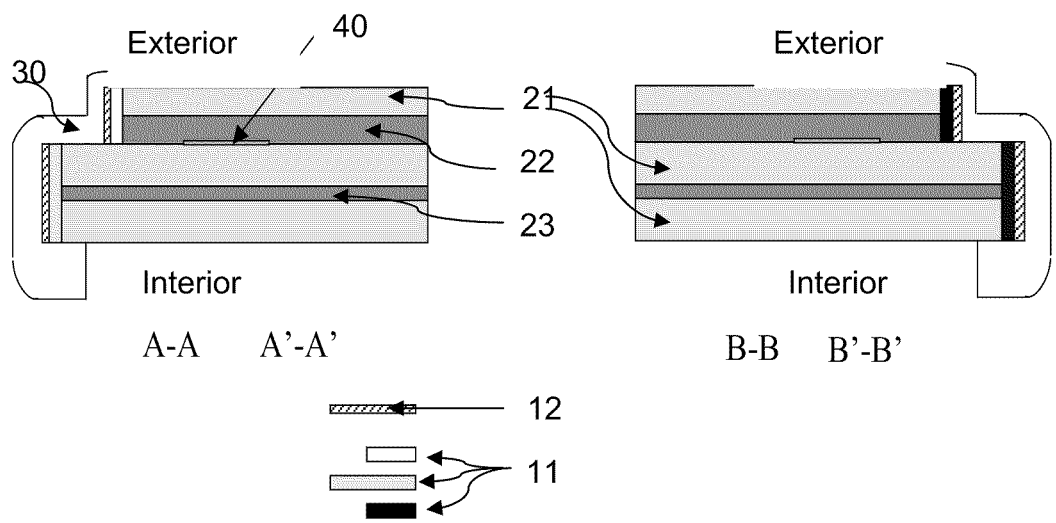
FIGS. 3 and 4 illustrate a mode of use specifically provided for the cockpit window of a plane.

In the specific case of a cockpit window, the peripheral device for improving sound insulation is adapted in its first embodiment, in absorbing multi-layer bands, as is shown in FIG. 3. The glass is a structure composed of multiple layers of glass 21 and inserted polyvinyl butyral (PVB) 23 or polyurethane (PU) 22 viscoelastic materials. A heating film 40 is used on one of the layers to avoid in flight defogging/defrosting problems.

The device consists of:
a first two-layer band (dense material 12, for example of a metallic type, such as an aluminum or titanium alloy combined with a viscoelastic material 11) adapted to low temperatures for the exterior layers of glass and polyurethane;
a second two-layer band (dense material 12, for example of a metallic type such as an aluminum or titanium alloy combined with a viscoelastic material 11) adapted to higher temperatures for interior layers of glass and polyvinyl butyral.

Figure 4:
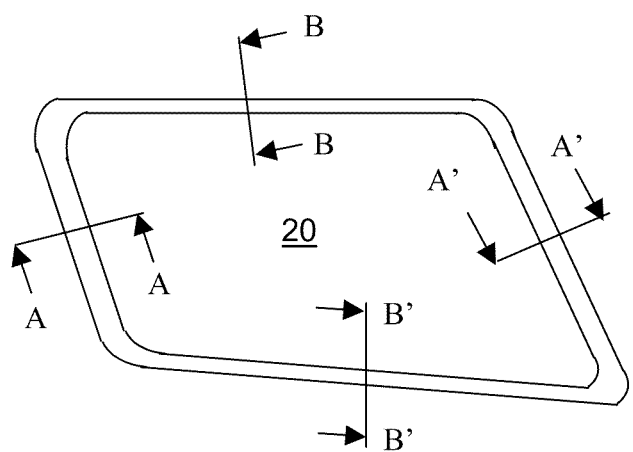

In order to maximize efficiency, two configurations of two-layer bands are considered, preferably symmetric depending on edges, as is shown in sections A-A, A'-A', and B-B, B'-B', of FIG. 4.

Figure 5:
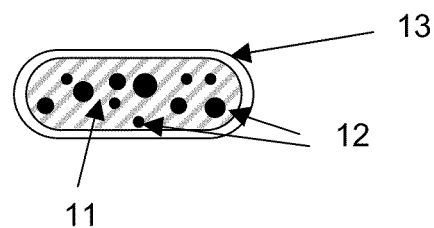
FIG. 5 is a schematic representation of another embodiment of a sound insulator for the sound insulating glazing device in accordance with the invention.

In a second embodiment, the two layers are replaced by elements made up of a resilient material 11 with inclusions 12 of a variable mass, as is shown in FIG. 5. For indicative purposes, the resilient material can be a gel, polymer, rubber blend, etc., without being restricted to such.

Figure 6:
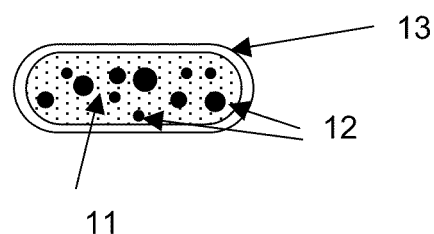
FIG. 6 is a schematic representation of yet another embodiment of a sound insulator for the sound insulating glazing device in accordance with the invention.

In a third embodiment, the peripheral elements are of granular 11 volumes of materials with inclusions of dense material, as is shown in FIG. 6. For indicative purposes, the granular material can be a silicate gel, polystyrene, etc, without being restricted to such.

As in the first embodiment, the volumes in the second and third embodiment have varying constituting forms and materials, depending on the treatment treated case. An envelope 13 ensures the maintaining and cohesion of the group.

The figures and their descriptions above illustrate the invention rather than limit it. In particular, the invention and its different variations are described in relation with particular examples of materials that are resilient, granular or less resilient. Nevertheless, it is evident to a person skilled in the art that the invention can be extended to other examples of materials having comparable qualities. The invention and its different variations are described in relation with examples from the aviation industry. Nevertheless, it is evident to a person skilled in the art that the invention can be extended to other domains such as glazing for ground transportation vehicles (cars, buses or trucks, cars or vehicles for trains, tramway or metro, etc.), maritime vehicles, buildings, or other applications, without a restrictive meaning.

The reference signs in the claims have no restrictive meaning. The verbs "comprise" and "include" do not exclude the presence of other elements than those listed in the claims. The word "one" preceding an element does not exclude the presence of multiple elements.

What is claimed is:

1. A sound insulating glazing device, comprising:
   a glazing;
   a sealing joint having a shape and size corresponding to an outer edge of the glazing and adapted for assembly on the outer edge; and
   a sound insulator made of at least two materials, a first resilient material and a second dense material, a resilience of the second material being less than a resilience of the first material, the sound insulator being disposed outward of the glazing against the outer edge of the glazing, between at least a part of the outer edge of the glazing and the sealing joint;
   wherein the first material and second material are organized in side by side layers, the layer of first material being disposed against the outer edge of the glazing and the layer of second material being disposed on an outer side of the layer of first material, against the sealing joint, to form a discrete unit, with a plurality of the discrete units arranged discontinuously along the periphery on the outer edge of the glazing.

2. A sound insulating glazing device according to claim 1, wherein the second material is metallic.

3. A sound insulating glazing device according to claim 1, wherein the glazing is a multi-layer glazing with an external glazing layer designed to be positioned on an exterior side of an aircraft, and an internal glazing layer, each glazing layer having mounted thereon a sound insulator and the sound insulator of each glazing layer having distinct mechanical behavior characteristics depending on temperature, the sound insulator of the external glazing layer having mechanical properties adapted to lower temperatures than the sound insulator of the internal glazing layer.

4. A sound insulating glazing device according to claim 1, wherein at least the first material differs depending on a zone of the glazing.

5. A sound insulating glazing device according to claim 1, wherein the first material forms a matrix housing multiple inclusions of the second material, the matrix being housed in a closed envelope.

6. A sound insulating glazing device according to claim 5, wherein the first material is chosen from a list consisting of gels, polymers and rubber blends.

7. A sound insulating glazing device according to claim 5, wherein the first material is granular.

8. A sound insulating glazing device according to claim 7, wherein the first material is chosen from a list consisting of silicate gels and polystyrene.

9. An aircraft equipped with at least one sound insulating glazing device according to claim 1.

10. An aircraft according to claim 9, wherein the sound insulating glazing device is used in a cockpit window.

11. A sound insulating glazing device, comprising:
a glazing;
a sealing joint having a shape and size corresponding to an outer edge of the glazing for assembly on the outer edge; and
a sound insulator made of a first resilient material and a second dense material, the sound insulator being disposed outward of the glazing against the outer edge of the glazing, between at least a part of the outer edge of the glazing and the sealing joint, the first material and second material coupled together side by side in layers to form a discrete unit,
wherein a plurality of discrete units are arranged so as to be spaced apart along a periphery of the glazing.

* * * * *